US010810102B2

(12) United States Patent
Koetter et al.

(10) Patent No.: US 10,810,102 B2
(45) Date of Patent: Oct. 20, 2020

(54) DATABASE MONITORING BY DATA VIRTUALIZATION

(71) Applicant: SAP SE, Walldorf (DE)

(72) Inventors: Thomas Theodor Koetter, Berlin (DE); Thomas Simenec, Berlin (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 15/362,534

(22) Filed: Nov. 28, 2016

(65) Prior Publication Data

US 2018/0150520 A1 May 31, 2018

(51) Int. Cl.
*G06F 16/00* (2019.01)
*G06F 11/34* (2006.01)
*H04L 29/08* (2006.01)
*G06F 16/25* (2019.01)
*G06F 16/27* (2019.01)

(52) U.S. Cl.
CPC ........ *G06F 11/3433* (2013.01); *G06F 16/256* (2019.01); *G06F 16/27* (2019.01); *H04L 67/1095* (2013.01); *G06F 2201/80* (2013.01); *G06F 2201/87* (2013.01)

(58) Field of Classification Search
CPC combination set(s) only.
See application file for complete search history.

(56) References Cited

U.S. PATENT DOCUMENTS

| 8,671,074 B2* | 3/2014 | Wang ...................... G06F 9/466 707/634 |
| 8,706,764 B2* | 4/2014 | Sivasubramanian ... G06F 12/02 707/792 |
| 8,880,682 B2* | 11/2014 | Bishop ................ G06F 11/3495 709/224 |
| 2009/0198651 A1* | 8/2009 | Shiffer .................... G06F 16/27 |

(Continued)

OTHER PUBLICATIONS

Boissier, Martin. "Optimizing main memory utilization of columnar in-memory databases using data eviction." In Proc. VLDB Ph. D. Workshop, pp. 1-6. 2014. (Year: 2014).*

(Continued)

*Primary Examiner* — Farhan M Syed
(74) *Attorney, Agent, or Firm* — Jones Day

(57) ABSTRACT

A computer implemented method for extended monitoring of a database includes establishing a data virtualization communications connection between a first and a second datacenter that is a copy of the first datacenter. Requests for monitoring information corresponding to the first datacenter are made by accessing its system views. Requests for monitoring information corresponding to the second datacenter are made by generating virtual tables on the first datacenter to provide the system views of the second datacenter to the first datacenter and accessing the virtual tables. The monitoring information corresponding to the first datacenter is grouped into a first schema on the first datacenter and the monitoring information corresponding to the second datacenter is grouped into a second schema, separate from (Continued)

the first schema. A union view is generated by combining the monitoring data associated with the two datacenters. Related apparatus, systems, techniques and articles are also described.

20 Claims, 5 Drawing Sheets

(56) References Cited

U.S. PATENT DOCUMENTS

| | | | |
|---|---|---|---|
| 2010/0250748 A1* | 9/2010 | Sivasubramanian | G06F 11/3442 709/226 |
| 2010/0251002 A1* | 9/2010 | Sivasubramanian | G06F 11/0793 714/2 |
| 2010/0251242 A1* | 9/2010 | Sivasubramanian | G06Q 10/06 718/100 |
| 2011/0145657 A1* | 6/2011 | Bishop | G06F 11/3495 714/47.1 |
| 2011/0251997 A1* | 10/2011 | Wang | G06F 11/2097 707/634 |
| 2012/0023066 A1* | 1/2012 | Bourbonnais | G06F 11/1451 707/613 |
| 2013/0066923 A1* | 3/2013 | Sivasubramanian | G06Q 10/06 707/802 |
| 2013/0218838 A1* | 8/2013 | Bevan | G06F 16/17 707/626 |
| 2013/0318038 A1* | 11/2013 | Shiffer | G06F 16/254 707/610 |
| 2018/0096039 A1* | 4/2018 | Otaguro | G06F 16/26 |
| 2018/0130092 A1* | 5/2018 | Nahass | A63F 13/352 |
| 2018/0139507 A1* | 5/2018 | Toksoz | A63F 13/355 |

OTHER PUBLICATIONS

Müller, Stephan, Lars Butzmann, Stefan Klauck, and Hasso Plattner. "An adaptive aggregate maintenance approach for mixed workloads in columnar in-memory databases." In Proceedings of the Thirty-Seventh Australasian Computer Science Conference—vol. 147, pp. 3-12. Australian Computer Society, Inc., (Year: 2014).*

* cited by examiner

DATABASE MONITORING BY DATA VIRTUALIZATION

TECHNICAL FIELD

The subject matter described herein relates to monitoring high availability database systems and to the use of data virtualization to enable a first datacenter to receive monitoring information about a second datacenter.

BACKGROUND

Databases rely on data replication and synchronization to maintain continuous system availability. Typically, in such a system, a complete copy of the database is stored at a first datacenter and the same complete copy of the database is stored at a second datacenter. The first and second datacenters may be in different locations. Since the data in the second datacenter needs to be the same as the data in the first datacenter, a synchronization mechanism is typically employed to handle synchronization of the data. If there is a failure associated with the first datacenter, the system can switch to using the second datacenter without significant issues.

Since the second datacenter may be asked to perform all of the same tasks as the first datacenter, typically, the second datacenter has the same hardware and software requirements as the first datacenter. However, the second datacenter is rarely utilized since it is a backup to the first datacenter.

SUMMARY

In some aspects, extended monitoring of a database includes establishing a data virtualization communications connection between a first and a second datacenter that is a copy of the first datacenter. The data virtualization communications connection may be a Smart Data Access (SDA) tool and may utilize an Open Database Connectivity (ODBC) protocol.

Requests for monitoring information corresponding to the first datacenter are made by accessing its system views. Requests for monitoring information corresponding to the second datacenter are made by generating virtual tables on the first datacenter to provide the system views of the second datacenter to the first datacenter and accessing the virtual tables. The monitoring information corresponding to the first datacenter is grouped into a first schema on the first datacenter and the monitoring information corresponding to the second datacenter is grouped into a second schema, also on the first datacenter, separate from the first schema. For the system views to be monitored, a union view is generated by combining the monitoring data associated with the two datacenters.

In some aspects, alerting based on the union view may be provided. Additionally, the connection status between the first datacenter and the second datacenter may be monitored and the virtual tables and/or the union view may be deleted upon detection that the second datacenter is no longer connected to the first datacenter.

In some aspects, a statistic server running on the first datacenter may be responsible for requesting the monitoring information from the first datacenter, requesting the monitoring information from the second datacenter, and/or generating the union view. This may be because the first datacenter has read-only access to the secondary datacenter. In some aspects, the first datacenter may be in an active mode and the second datacenter may be in an active mode to enable distribution of the workload between the first datacenter and the second datacenter.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods may be implemented by one or more data processors either within a single computing system or distributed among two or more computing systems. Such computing systems may be connected and may exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the extended monitoring described herein may facilitate the monitoring of a second datacenter (e.g., in a load balancing operation) so that a first datacenter and a second datacenter can be simultaneously utilized more effectively. The extended monitoring may be automatically initiated and terminated based on a connection status of the second datacenter relative to the first datacenter, thereby reducing complex, error-prone interaction by an administrator or other user. The extended monitoring may also facilitate the monitoring of a second datacenter such that better utilization of hardware (e.g., processors and memory) can be achieved with the database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in memory database (IMDB) in which the data associated with the database is stored in main memory instead of a disk storage so it may be accessed more quickly. IMDB systems are generally column oriented databases since column oriented databases make more efficient use of the expensive main memory.

Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (backup) copy of the data associated with the database.

To better utilize the second datacenter, some database systems, such as SAP HANA®, may simultaneously utilize the first datacenter and the second datacenter. In this mode of operation, the first datacenter may be configured to delegate queries to the second datacenter to balance the load between the two systems. Such a situation may be referred to as Active/Active (AA) operation since the first datacenter and the second datacenter both actively respond to queries at the same time.

Database monitoring is desirable so an administrator or user is aware of the current state or health of the database and is able to obtain historical statistics about the database and its health. If a first datacenter and a second datacenter are both available for use, it may be desirable to monitor both datacenters to obtain monitoring information related to both datacenters. Monitoring information may include, for example, table sizes, CPU usage, memory usage, etc. Additionally, since the first datacenter delegates queries to the second datacenter, it may be desirable for the first datacenter to obtain the monitoring information from both datacenters. In some embodiments, the first datacenter may also utilize the combined monitoring information to aid in query delegation and/or provide alert information to an administrator or user of the database system.

Figure 1:
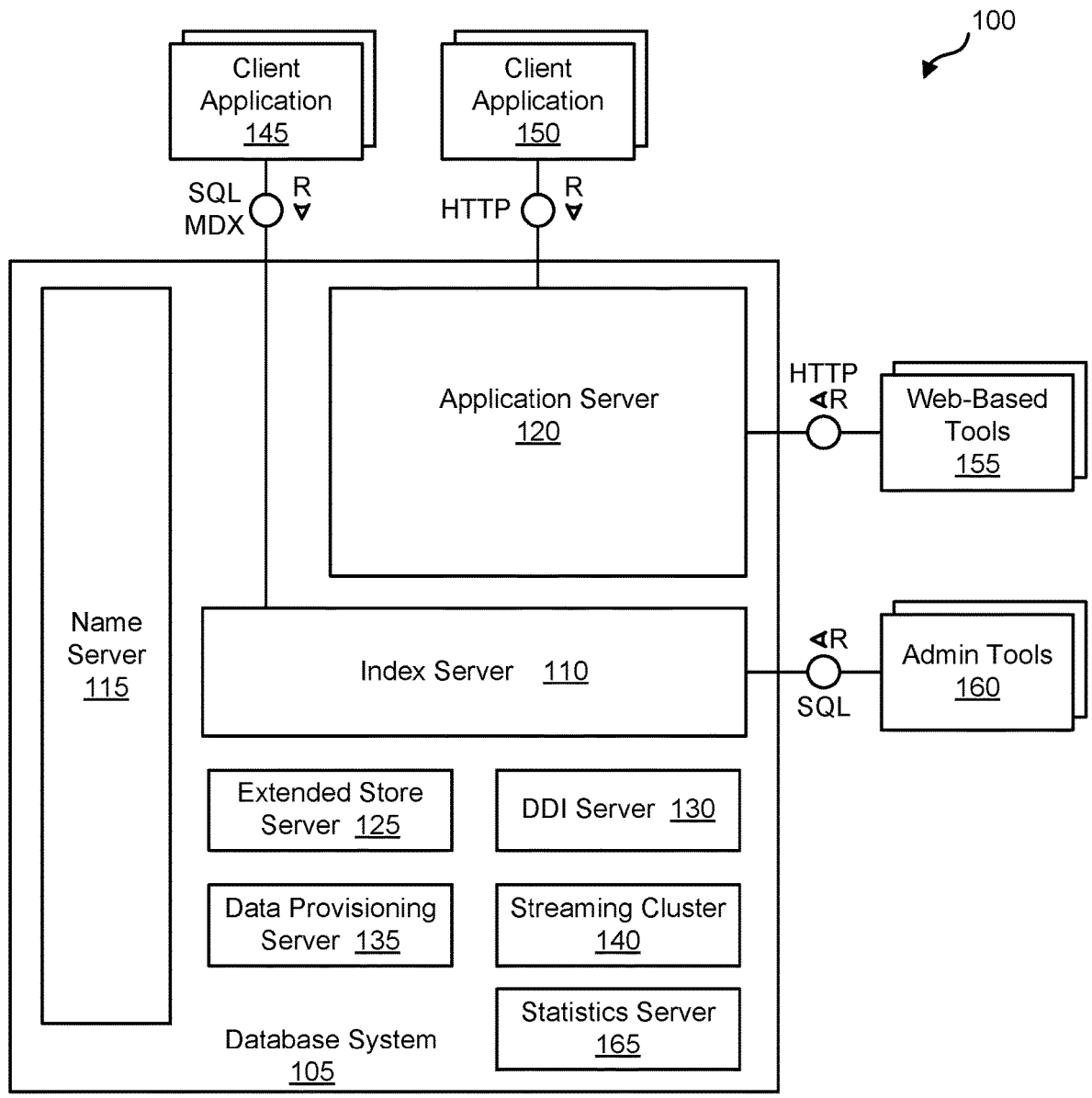
FIG. 1 is a system diagram illustrating an example database system for use in connection with the current subject matter.

FIG. 1 is a diagram 100 illustrating a database system 105 that may be used to implement aspects of the current subject matter. The database system 105 may, for example, be an in-memory database in which all relevant data is kept in main memory so that read operations may be executed without disk I/O operations which are required by disk storage to make any changes durable. The database system 105 may include a plurality of servers including, for example, one or more of an index server 110, a name server 115, and/or an application server 120. The database system 105 may also include one or more of an extended store server 125, a database deployment infrastructure (DDI) server 130, a data provisioning server 135, a streaming cluster 140, and/or a statistics server 165 (which may be embedded within the index server 110). The database system 105 may be accessed by a plurality of remote clients 145, 150 via different protocols such as SQL/MDX (e.g., by way of the index server 110) and/or web-based protocols such as HTTP (e.g., by way of the application server 120).

The index server 110 may contain in-memory data stores and engines for processing data. The index server 110 may also be accessed by remote tools (via, for example, SQL queries), that may provide various development environment and administration tools. Additional details regarding an example implementation of the index server 110 are described and illustrated in connection with diagram 300 of FIG. 3.

The name server 115 may own information about the topology of the database system 105. In a distributed database system, the name server 115 may know where various components are running and which data is located on which server. In a database system 105 with multiple database containers, the name server 115 may have information about existing database containers and it may also host the system database. For example, the name server 115 may manage the information about existing tenant databases. Unlike a name server 115 in a single-container system, the name server 115 in a database system 105 having multiple database containers may not store topology information such as the location of tables in a distributed database. In a multi-container database system 105 such database-level topology information may be stored as part of the catalogs of the tenant databases.

The application server 120 may enable native web applications used by one or more remote clients 150 accessing the database system 105 via a web protocol such as HTTP. The application server 120 may allow developers to write and run various database applications without the need to run an additional application server. The application server 120 may also be used to run web-based tools 155 for administration, life-cycle management, and development. Other administration and development tools 160 may directly access the index server 110, for example, via SQL and other protocols.

The extended store server 125 may be part of a dynamic tiering option that may include a high-performance disk-based column store for very big data up to the petabyte range and beyond. Less frequently accessed data (for which is it non-optimal to maintain in main memory of the index server 110) may be put into the extended store server 125. The dynamic tiering of the extended store server 125 allows for hosting of very large databases with a reduced cost of ownership as compared to conventional arrangements.

The DDI server 130 may be a separate server process that is part of a database deployment infrastructure (DDI). The DDI may be a layer of the database system 105 that simplifies the deployment of database objects using declarative design time artifacts. DDI may ensure a consistent deployment, for example, by guaranteeing that multiple objects are deployed in the right sequence based on dependencies, and by implementing a transactional all-or-nothing deployment.

The data provisioning server 135 may provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (e.g., data feeds, etc.) to be utilized by the database system 105. The streaming cluster 140 allows for both consumption of data streams and for complex event processing.

The statistics server 165 enables internal monitoring of the database system 105. The statistics server 165 may notify or alert an administrator when critical situations arise and may provide historical monitoring data as well. In some embodiments, the statistics server 165 may be embedded as a statistics service within the index server 110 within database system 105.

Figure 2:
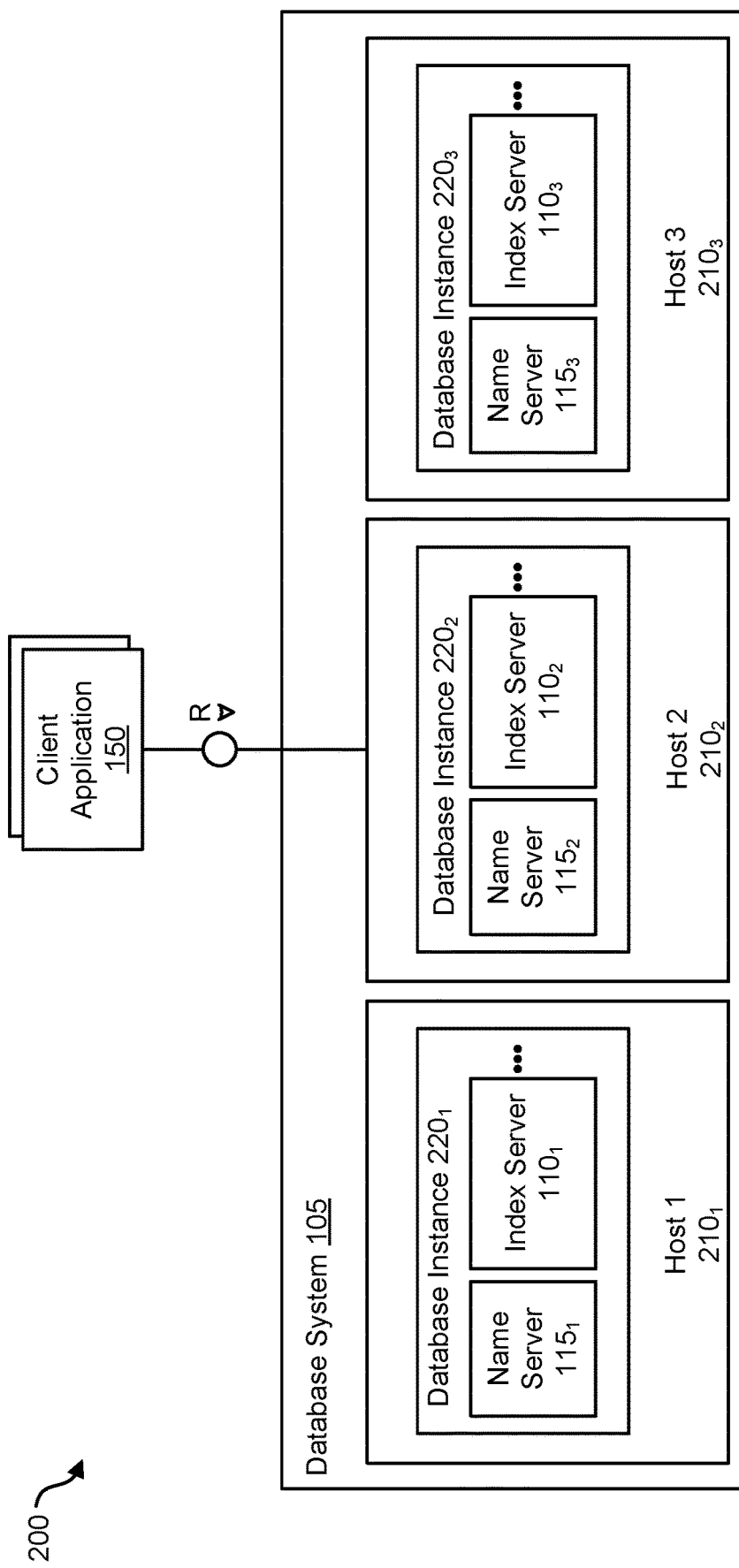
FIG. 2 is a system diagram illustrating a distributed database system having a plurality of database instances.

FIG. 2 is a diagram 200 illustrating a variation of the database system 105 that may support distribution of server components across multiple hosts for scalability and/or availability purposes. This database system 105 may, for example, be identified by a single system ID (SID) and it may be perceived as one unit from the perspective of an administrator, who may install, update, start up, shut down, or backup the system as a whole. The different components of the database system 105 may share the same metadata, and requests from client applications 150 may be transparently dispatched to different servers 110$_{1-3}$, 120$_{1-3}$, in the system, if required.

As is illustrated in FIG. 2, the distributed database system 105 may be installed on more than one host 210$_{1-3}$. Each host 210$_{1-3}$ is a machine that may comprise at least one data processor (e.g., a CPU, etc.), memory, storage, a network interface, and an operation system and which executes part of the database system 105. Each host 210$_{1-3}$ may execute a database instance 220$_{1-3}$ which comprises the set of components of the distributed database system 105 that are installed on one host 210$_{1-3}$. FIG. 2 shows a distributed system with three hosts, which each run a name server 115$_{1-3}$, index server 110$_{1-3}$, and so on (other components are omitted to simplify the illustration).

Figure 3:
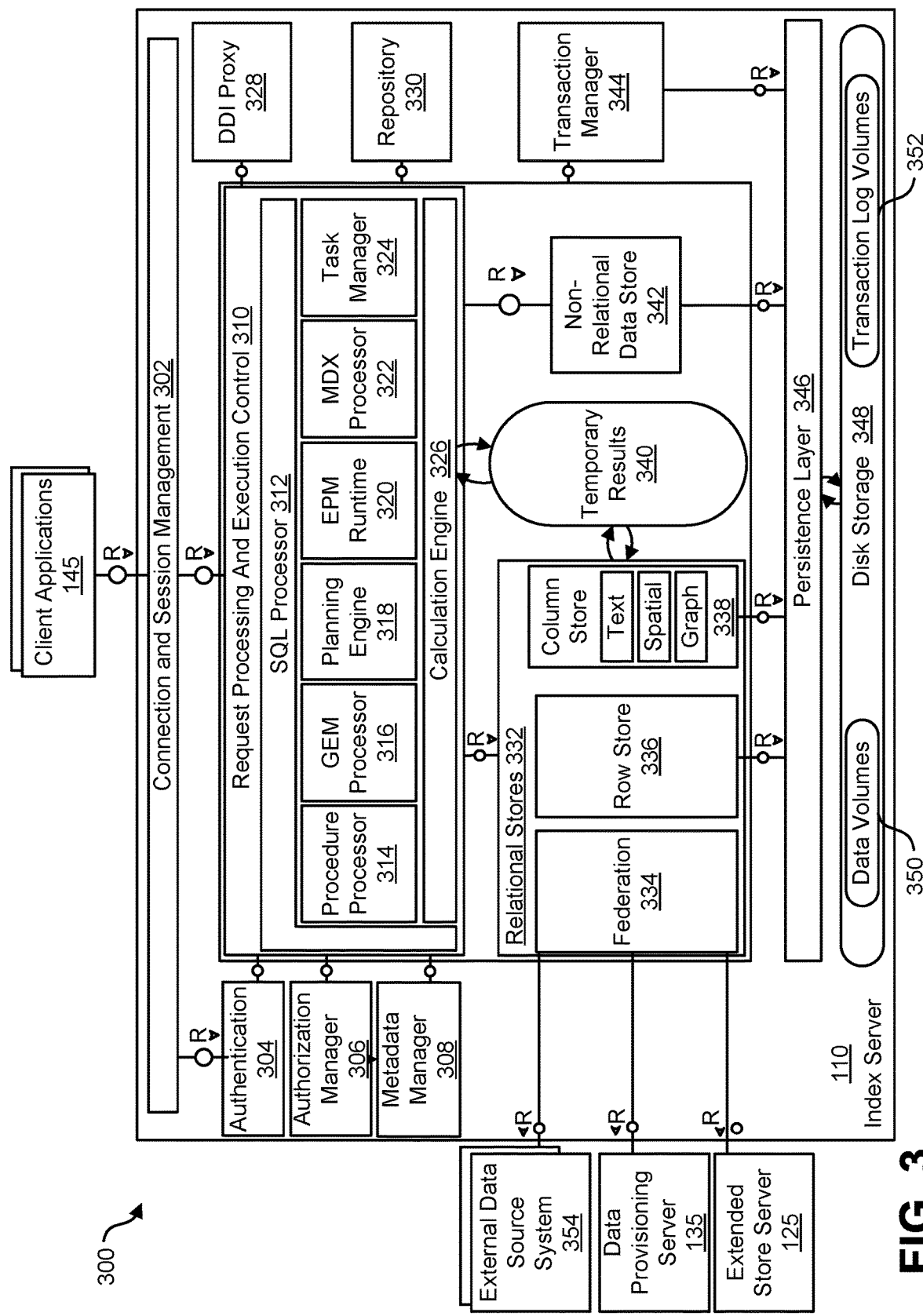
FIG. 3 is a system diagram of an index server forming part of the database system of FIG. 1.

FIG. 3 is a diagram 300 illustrating an architecture for the index server 110 (which may, as indicated above, be one of many instances). A connection and session management component 302 may create and manage sessions and connections for the client applications 145. For each session, a set of parameters may be maintained such as, for example, auto commit settings or the current transaction isolation level.

Requests from the client applications 145 may be processed and executed by way of a request processing and execution control component 310. The database system 105 offers rich programming capabilities for running application-specific calculations inside the database system. In addition to SQL, MDX, and WIPE, the database system 105 may provide different programming languages for different use cases. SQLScript may be used to write database procedures and user defined functions that may be used in SQL statements. L language may be used to implement operator logic that may be called by SQLScript procedures and for writing user-defined functions.

Once a session is established, client applications 145 typically use SQL statements to communicate with the index server 110 which may be handled by a SQL processor 312 within the request processing and execution control component 310. Analytical applications may use the multidimensional query language MDX (MultiDimensional eXpressions) via an MDX processor 322. For graph data, applications may use GEM (Graph Query and Manipulation) via a GEM processor 316, a graph query and manipulation language. SQL statements and MDX queries may be sent over the same connection with the client application 145 using the same network communication protocol. GEM statements may be sent using a built-in SQL system procedure.

The index server 110 may include an authentication component 304 that may be invoked when a new connection with a client application 145 is established. Users may be authenticated either by the database system 105 itself (login with user and password) or authentication may be delegated to an external authentication provider. An authorization manager 306 may be invoked by other components of the database system 105 to check whether the user has the required privileges to execute the requested operations.

Statements may be processed in the context of a transaction. New sessions may be implicitly assigned to a new transaction. The index server 110 may include a transaction manager 344 that coordinates transactions, controls transactional isolation, and keeps track of running and closed transactions. When a transaction is committed or rolled back, the transaction manager 344 may inform the involved engines about this event so they may execute necessary actions. The transaction manager 344 may provide various types of concurrency control and it may cooperate with a persistence layer 346 to achieve atomic and durable transactions.

Incoming SQL requests from the client applications 145 may be received by the SQL processor 312. Data manipulation statements may be executed by the SQL processor 312 itself. Other types of requests may be delegated to the respective components. Data definition statements may be dispatched to a metadata manager 306, transaction control statements may be forwarded to the transaction manager 344, planning commands may be routed to a planning engine 318, and task related commands may be forwarded to a task manager 324 (which may be part of a larger task framework). Incoming MDX requests may be delegated to the MDX processor 322. Procedure calls may be forwarded to the procedure processor 314, which further dispatches the calls, for example to a calculation engine 326, the GEM processor 316, a repository 300, or a DDI proxy 328.

The index server 110 may also include a planning engine 318 that allows planning applications, for instance for financial planning, to execute basic planning operations in the database layer. One such basic operation is to create a new version of a data set as a copy of an existing one while applying filters and transformations. For example, planning data for a new year may be created as a copy of the data from the previous year. Another example for a planning operation is the disaggregation operation that distributes target values from higher to lower aggregation levels based on a distribution function.

The SQL processor 312 may include an enterprise performance management (EPM) runtime component 320 that may form part of a larger platform providing an infrastructure for developing and running enterprise performance management applications on the database system 105. While the planning engine 318 may provide basic planning operations, the EPM platform provides a foundation for complete planning applications, based on application-specific planning models managed in the database system 105.

The calculation engine 326 may provide a common infrastructure that implements various features such as SQLScript, MDX, GEM, tasks, and planning operations. The SQLScript processor 312, the MDX processor 322, the planning engine 318, the task manager 324, and the GEM processor 316 may translate the different programming languages, query languages, and models into a common representation that is optimized and executed by the calculation engine 326. The calculation engine 326 may implement those features using temporary results 340 which may be based, in part, on data within the relational stores 332.

Metadata may be accessed via the metadata manager component 308. Metadata, in this context, may comprise a variety of objects, such as definitions of relational tables, columns, views, indexes and procedures. Metadata of all these types may be stored in one common database catalog for all stores. The database catalog may be stored in tables in a row store 336 forming part of a group of relational stores 332. Other aspects of the database system 105 including, for example, support and multi-version concurrency control may also be used for metadata management. In distributed systems, central metadata may be shared across servers and the metadata manager 308 may coordinate or otherwise manage such sharing.

The relational stores 332 form the different data management components of the index server 110 and these relational stores may, for example, store data in main memory. The row store 336, a column store 338, and a federation component 334 are all relational data stores which may provide access to data organized in relational tables. The column store 338 may store relational tables column-wise (i.e., in a column-oriented fashion, etc.). The column store 338 may also comprise text search and analysis capabilities, support for spatial data, and operators and storage for graph-structured data. With regard to graph-structured data, from an application viewpoint, the column store 338 may be viewed as a non-relational and schema-flexible in-memory data store for graph-structured data. However, technically such a graph store is not a separate physical data store. Instead it is built using the column store 338, which may have a dedicated graph API.

The row store 336 may store relational tables row-wise. When a table is created, the creator may specify whether it should be row or column-based. Tables may be migrated between the two storage formats. While certain SQL extensions are only available for one kind of table (such as the "merge" command for column tables), standard SQL may be used on all tables. The index server 110 also provides functionality to combine both kinds of tables in one statement (join, sub query, union).

The federation component 334 may be viewed as a virtual relational data store. The federation component 334 may provide access to remote data in external data source system(s) 354 through virtual tables, which may be used in SQL queries in a fashion similar to normal tables.

The database system 105 may include an integration of a non-relational data store 342 into the index server 110. For example, the non-relational data store 342 may have data represented as networks of C++ objects, which may be persisted to disk. The non-relational data store 342 may be used, for example, for optimization and planning tasks that operate on large networks of data objects, for example in supply chain management. Unlike the row store 336 and the column store 338, the non-relational data store 342 does not use relational tables; rather, objects may be directly stored in containers provided by the persistence layer 346. Fixed size entry containers may be used to store objects of one class. Persisted objects may be loaded via their persisted object IDs, which may also be used to persist references between objects. In addition, access via in-memory indexes is supported. In that case, the objects need to contain search keys. The in-memory search index is created on first access. The non-relational data store 342 may be integrated with the transaction manager 344 to extend transaction management with sub-transactions, and to also provide a different locking protocol and implementation of multi version concurrency control.

An extended store is another relational store that may be used or otherwise form part of the database system 105. The extended store may, for example, be a disk-based column store optimized for managing very big tables, which may not be desirable to keep in memory (as with the relational stores 332). The extended store may run in an extended store server 125 separate from the index server 110. The index server 110 may use the federation component 334 to send SQL statements to the extended store server 125.

The persistence layer 346 is responsible for durability and atomicity of transactions. The persistence layer 346 may ensure that the database system 105 is restored to the most recent committed state after a restart and that transactions are either completely executed or completely undone. To achieve this goal in an efficient way, the persistence layer 346 may use a combination of write-ahead logs, shadow paging and savepoints. The persistence layer 346 may provide interfaces for writing and reading persisted data and it may also contain a logger component that manages a transaction log. Transaction log entries may be written explicitly by using a log interface or implicitly when using the virtual file abstraction.

The persistence layer 346 stores data in persistent disk storage 348 which, in turn, may include data volumes 350 and/or transaction log volumes 352 that may be organized in pages. Different page sizes may be supported, for example, between 4 k and 16 M. Data may be loaded from the disk storage 348 and stored to disk page wise. For read and write access, pages may be loaded into a page buffer in memory. The page buffer need not have a minimum or maximum size, rather, all free memory not used for other things may be used for the page buffer. If the memory is needed elsewhere, least recently used pages may be removed from the cache. If a modified page is chosen to be removed, the page first needs to be persisted to disk storage 348. While the pages and the page buffer are managed by the persistence layer 346, the in-memory stores (i.e., the relational stores 332) may access data within loaded pages.

Figure 4:
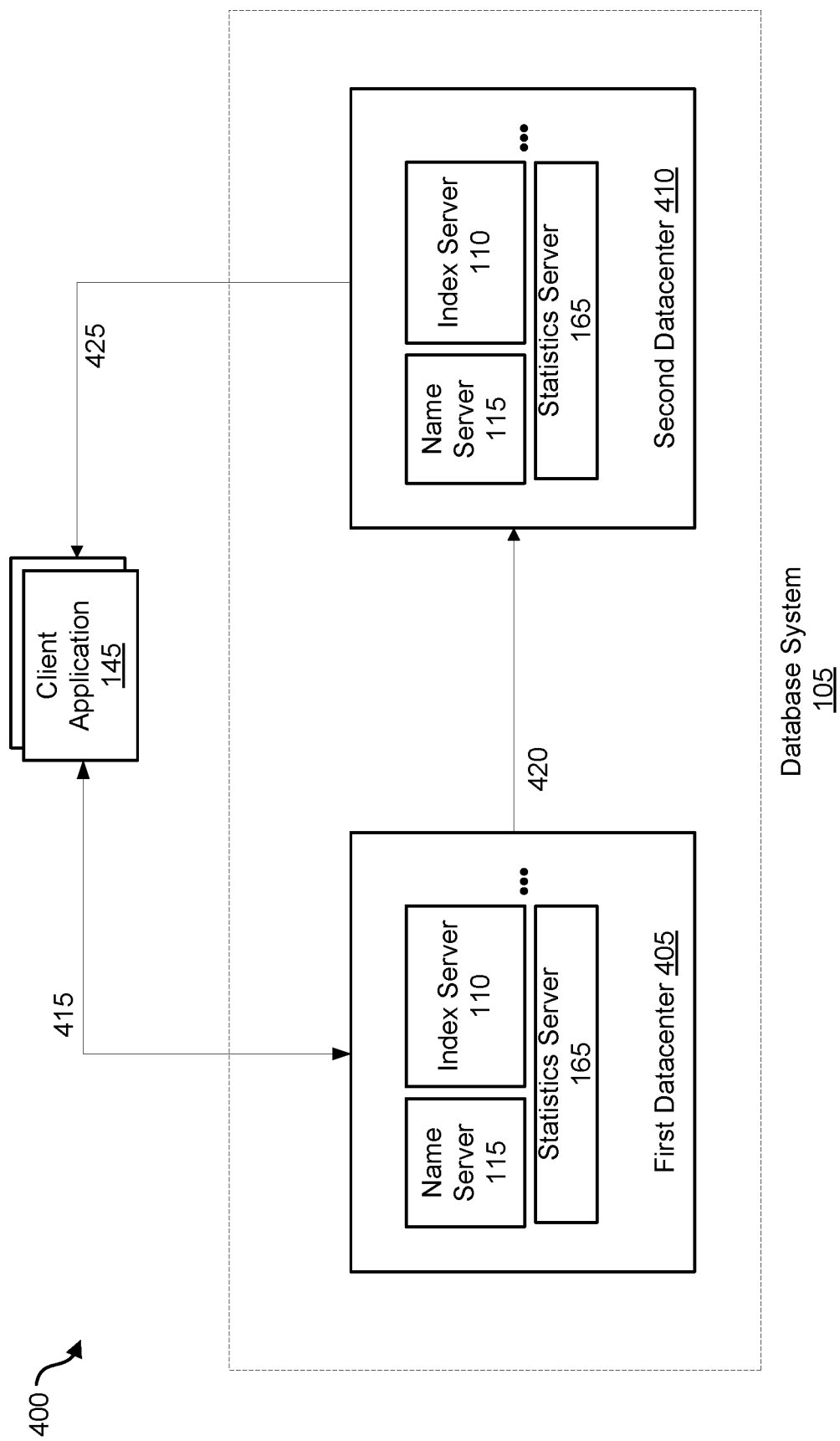
FIG. 4 is a system diagram illustrating an active/active operation of a database system.

FIG. 4 is a system diagram 400 illustrating an active/active operation of a database system. In system 400, database system 105 includes a first datacenter 405 and a second datacenter 410. The second datacenter 410 may be a backup for first datacenter 105 that includes an identical copy of the data stored in first datacenter 405. This structure 400 is distinguished from the structure 200 illustrated in FIG. 2 since these are not multiple instances of a single database that are seen as a single entity but rather two separate datacenters where one is a backup (or replicated copy) of the other.

The second datacenter 410 may be a complete copy of the first datacenter 405. For example, the two datacenters may include the same data as mentioned above, but in some embodiments, the second datacenter 410 may also include the same memory and processor resources as the first datacenter 405. Since the second datacenter 410 may be asked to perform all of the same tasks as the first datacenter 105 if the first datacenter 405 fails, typically, the second datacenter has the same hardware and software requirements as the first datacenter. Accordingly, the first datacenter 405 and the second datacenter 410 may both include a name server 115, an index server 110, a statistics server 165, and any additional servers that may be desirable (e.g., any of the various servers and other components illustrated in FIG. 1 and FIG. 3). As discussed above, the statistics server 165 may be embedded as a statistics service into the index server 110. In some embodiments, the first data center 405 and the second datacenter 410 may be in different geographic locations.

Since the data in the second datacenter 410 needs to be the same as the data in the first datacenter 405, a synchronization mechanism is typically employed to handle synchronization of the data. In this manner, if there is a failure associated with the first datacenter 405, the system 400 can switch to using the second datacenter 410 without significant issues. In fact, in some embodiments, the switchover may be completely transparent to the user. To facilitate effective and reliable synchronization, in some embodiments, the second datacenter 410 may be a read-only copy of the first datacenter 405. This read-only structure may enable more reliable replication since data will only need to be replicated/synchronized in one direction—from the first datacenter 405 to the second datacenter 410. Two-way synchronization may be more complex, more cumbersome, and/or more prone to errors.

An idle second datacenter 410 may not be desirable since the cost of maintaining it, relative to its usage, may be significant. Accordingly, as discussed above, to better utilize the second datacenter, some database systems, such as SAP HANA®, may simultaneously utilize the first datacenter and the second datacenter to respond to queries. In this mode of operation, the first datacenter may be configured to delegate queries to the second datacenter to balance the load between the two systems. Such a situation may be referred to as Active/Active (AA) operation since the first datacenter and the second datacenter both actively respond to queries.

Although an active/active operation is beneficial, the main purpose of the second datacenter 410 may still be as a backup to the first datacenter 405. That is, the benefits of an active/active mode of operation should not compromise the reliability of the replication system. Accordingly, in some embodiments, it may be desirable to maintain certain restrictions on the second datacenter 410. For example, even though the second datacenter 410 is actively responding to queries, client applications 145 may not be permitted to directly access the second datacenter 410 since the second datacenter 410 is maintained as read-only.

Accordingly, in operation, when a user makes a query (e.g., an SQL query), it may be sent to the first datacenter 405 which is configured for bi-directional communication 415 with the client applications 145. The first datacenter 405 may respond to the query via communication 415 or the first datacenter 405 may delegate the query to the second datacenter 410 via communication 420 and the second datacenter 410 may respond to the client application 145. The response to the client application 145 may be via a unidirectional communication 425.

As discussed above, monitoring the status of the database system may be desirable and such monitoring may be done by the statistics server 165 (e.g., a statistics service embedded in the index server). If a first datacenter and a second datacenter are both available, it may be desirable to monitor both datacenters to obtain monitoring information related to both datacenters. As discussed above, monitoring information may include, for example, table sizes, CPU usage, memory usage, etc. Additionally, since the first datacenter 405 delegates queries to the second datacenter 410, it may be desirable for the first datacenter 405 to obtain the monitoring information from both datacenters. For example, monitoring information from both datacenters may be utilized to assist with load balancing between the two datacenters in an active/active operation.

Generally, monitoring information may be provided by the statistics server 165 (e.g., a statistics service embedded in the index server) but in the case of the second datacenter 410, the statistics service may not be operational. Since the statistics server 165 collects monitoring information and writes views and tables to memory, the statistics service in the second datacenter 410 is disabled when the second datacenter 410 is in a read-only mode. Therefore, the necessary monitoring cannot be completed by the second datacenter 410 and the first datacenter 405 cannot access system views and tables stored in the second datacenter since no such system views and/or tables exist.

To obtain this information, the first datacenter 405 may establish a data virtualization communications connection between the first datacenter 405 and the second datacenter 410. In some embodiments, the connection may be via SAP's Smart Data Access (SDA) tool. SDA is a data virtualization tool that is available from SAP and allows remote databases to be accessed via, for example, SQL queries. It provides database users with the ability to access and query data from remote databases without copying the remote data into the requesting database system. By adapting the SDA tool, a connection can be established between the first datacenter 405 and the second datacenter 410 in which the first datacenter 405 views the second datacenter 410 as a remote database and not merely a copy of the first database. Accordingly, the data virtualization connection may interpret the two datacenters as separate databases and enable a connection between them in such a manner that allows the first datacenter 405 to access data in the second datacenter 410 without writing data to the second datacenter 410.

In some embodiments, the SDA tool may create an open database connectivity (ODBC) connection protocol between the first datacenter 405 and the second datacenter 410. An ODBC connection protocol does not require that the datacenters have the same operating system or even that they be the same system. In some embodiments, the ODBC protocol may use an ODBC driver induced as part of the database (e.g., HANA) installation.

With respect to the monitoring information about the first datacenter 405, the statistics server 165 in the first datacenter 405 may simply request monitoring information about the first datacenter 405 by accessing the system views of the first datacenter 405 via well understood methods. However, to request monitoring information corresponding to the second datacenter 410, the first datacenter 405 may generate at least one virtual table on the first datacenter 405 to provide the system views of the second datacenter 410 to the first datacenter 405. In some embodiments, one virtual table may provide access to one system view. For example, when the virtual table is accessed by the first datacenter 405, a select operation may be routed (e.g., via an SQL optimizer), to the second datacenter 410 and the data may be transferred to the first datacenter 405. In some embodiments, the virtual tables at the first datacenter 405 may merely point to the relevant data within the second datacenter 410 so data is not written to the second datacenter 410 or transferred to the first datacenter 405.

The monitoring information from the first datacenter 405 and the monitoring information from the second datacenter 410 may be separately grouped into a schema on the first datacenter. In some embodiments, the structure of the data in each schema may be same for both datacenters 405, 410. In some embodiments, the tables may be created dynamically. Additionally, the two schemas may be combined into a union view by combining the monitoring data associated with the first datacenter and the monitoring data associated with the second datacenter. Queries may operate on the union view and return the requested results. Additionally, alerting (e.g., automatic alerting) by the statistics server may be provided to a system administrator based, at least in part, on the data in the union view.

In some embodiments, it may be desirable for this monitoring to by automatically configured in real time so the monitoring information is reliable (current) in real time. For example, if the second datacenter 410 is no longer connected to the first datacenter 405, the union view may be updated (e.g., automatically updated by the first datacenter) to remove the monitoring data for the second datacenter 410. Accordingly, in some embodiments, the statistics server 165 on the first datacenter 405 may monitor the connection status between the first datacenter 405 and the second datacenter 410 and automatically delete the virtual tables and/or the union view if it detects that the second datacenter 410 is no longer connected to the first datacenter 405. In some embodiments, the if the connection between the two datacenters is lost, the union view may be updated accordingly but if the load balancing (Active/Active) configuration is unregistered, the union view may be deleted. In some embodiments, the connection between the first datacenter 405 and the second datacenter 410 may be configured by automatically obtaining host information of the second datacenter 410.

In some embodiments, user credentials (e.g., username and password) may be required to access the second datacenter 410. User credentials may be replicated on both the first datacenter 405 and the second datacenter 410. Accordingly, a user account that already exists for replication services may be used to access the second datacenter 410 for monitoring information since the credentials will be the same.

Figure 5:
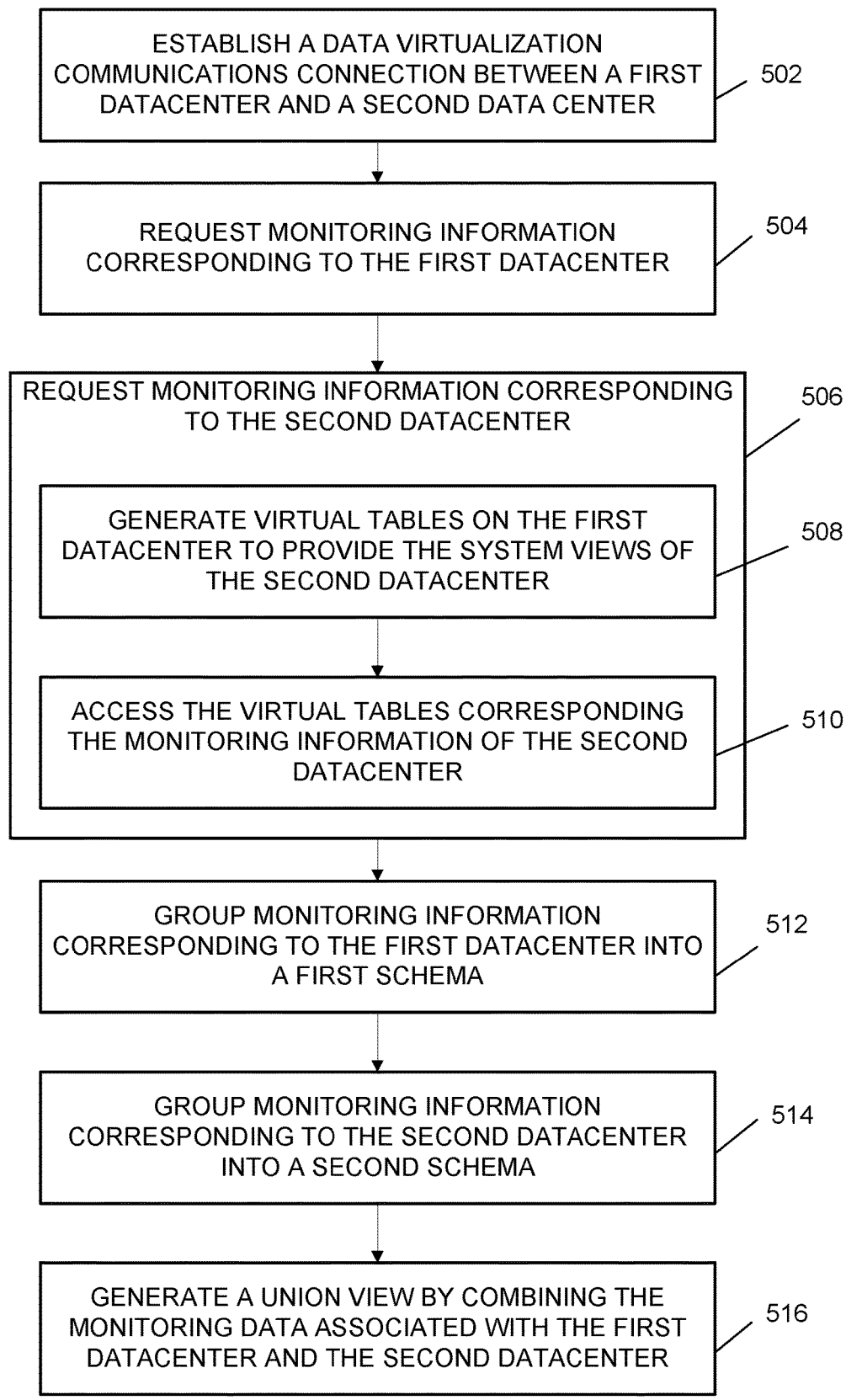
FIG. 5 is a flowchart illustrating an exemplary operation of a system for performing extended monitoring.

FIG. 5 is a flowchart illustrating an exemplary operation of a system for performing extended monitoring. In some embodiments, the method may be performed by the first datacenter 405. In operation 502, a data virtualization communications connection is established between a first datacenter 405 and a second datacenter 410. As described above, the second datacenter 410 may be a copy of the first datacenter 405. In operation 504, the first datacenter 405 requests monitoring information corresponding to the first datacenter 405 by accessing system views of the first datacenter 405. In operation 506, the first datacenter 405 requests monitoring information corresponding to the second datacenter 410. As illustrated in FIG. 5, requesting the monitoring information from the second datacenter 510 may include generating virtual tables on the first datacenter to provide the system views of the second datacenter to the first datacenter in operation 508 and accessing the virtual tables at operation 510. In operation 512, the first datacenter 405 groups the monitoring information corresponding to the first datacenter into a first schema. The data is stored on the first datacenter. In operation 514, the first datacenter 405 groups the monitoring information corresponding to the second datacenter into a second schema. As discussed above, the second schema separate may be different from the first schema and, in some embodiments, the structure of the data in both schemas may be the same. In operation 516, the first datacenter generates a union view by combining the monitoring data associated with the first datacenter and the monitoring data associated with the second datacenter.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
   establishing a data virtualization communications connection between a first datacenter and a second datacenter, the second datacenter being a copy of the first datacenter;
   requesting monitoring information corresponding to the first datacenter by accessing system views of the first datacenter;
   requesting monitoring information corresponding to the second datacenter by:
      generating at least one virtual table on the first datacenter to provide the system views of the second datacenter to the first datacenter;
      accessing the at least one virtual table corresponding to the monitoring information of the second datacenter;
      routing a select operation to the second datacenter; and
      transferring data to the first datacenter in response to the routing;
   grouping the monitoring information corresponding to the first datacenter into a first schema on the first datacenter;
   grouping the monitoring information corresponding to the second datacenter into a second schema, separate from the first schema on the first datacenter;
   generating a union view by combining the monitoring data associated with the first datacenter and the monitoring data associated with the second datacenter on the first datacenter;
   receiving, by the first datacenter, a query requesting monitoring information for both of the first data center and the second data center; and
   providing, by the first datacenter accessing the union view, results responsive to the query;
   wherein the data virtualization connection interprets the first datacenter and the second datacenter as separate databases.

2. The method of claim 1, further comprising providing alerting based at least in part on the union view.

3. The method of claim 1, further comprising:
   monitoring the connection status between the first datacenter and the second datacenter; and
   updating the at least one virtual table and the union view upon detection that the second datacenter is no longer connected to the first datacenter.

4. The method of claim 1, wherein a statistic server running on the first datacenter is responsible for requesting the monitoring information from the first datacenter, requesting the monitoring information from the second datacenter, and generating the union view.

5. The method of claim 1, wherein the first datacenter has read-only access to the second datacenter.

6. The method of claim 1, wherein the first datacenter is in an active mode and the second datacenter is in an active mode to enable distribution of the workload between the first datacenter and the second datacenter.

7. The method of claim 1, wherein the database is an in memory database (IMDB).

8. The method of claim 1, wherein the database is a column oriented database.

9. The method of claim 1, wherein the data virtualization communications connection utilizes an Open Database Connectivity (ODBC) protocol using the database ODBC driver included as part of the database installation.

10. The method of claim 1, wherein the data virtualization communications connection is enabled via a Smart Data Access (SDA) tool.

11. A system comprising:
    a processor; and
    a non-transitory computer readable media having computer executable instructions stored therein, which, when executed by the processor, causes the system to perform operations comprising:
       establishing a data virtualization communications connection between a first datacenter and a second datacenter, the second datacenter being a copy of the first datacenter;
       requesting monitoring information corresponding to the first datacenter by accessing system views of the first datacenter;
       requesting monitoring information corresponding to the second datacenter by:
          generating at least one virtual table on the first datacenter to provide the system views of the second datacenter to the first datacenter;
          accessing the at least one virtual table corresponding to the monitoring information of the second datacenter;
          routing a select operation to the second datacenter; and
          transferring data to the first datacenter in response to the routing;
       grouping the monitoring information corresponding to the first datacenter into a first schema on the first datacenter;
       grouping the monitoring information corresponding to the second datacenter into a second schema, separate from the first schema on the first datacenter; and
       generating a union view by combining the monitoring data associated with the first datacenter and the monitoring data associated with the second datacenter on the first datacenter;
    receiving, by the first datacenter, a query requesting monitoring information for both of the first data center and the second data center; and
    providing, by the first datacenter accessing the union view, results responsive to the query;
    wherein the data virtualization connection interprets the first datacenter and the second datacenter as separate databases.

12. The system of claim 11, wherein the operations further comprise providing alerting based at least in part on the union view.

13. The system of claim 11, wherein the operations further comprise:
    monitoring the connection status between the first datacenter and the second datacenter; and updating the at least one virtual table and the union view upon detection that the second datacenter is no longer connected to the first datacenter.

14. The system of claim 11, wherein a statistic server running on the first datacenter is responsible for requesting the monitoring information from the first datacenter, requesting the monitoring information from the second datacenter, and generating the union view.

15. The system of claim 11, wherein the first datacenter has read-only access to the second datacenter.

16. The system of claim 11, wherein the first datacenter is in an active mode and the second datacenter is in an active mode to enable distribution of the workload between the first datacenter and the second datacenter.

17. The system of claim 11, wherein the database is an in memory database (IMDB).

18. The system of claim 11, wherein the database is a column oriented database.

19. The system of claim 11, wherein the data virtualization communications connection utilizes an Open Database Connectivity (ODBC) protocol using the database ODBC driver included as part of the database installation.

20. The system of claim 11, wherein the data virtualization communications connection is enabled via a Smart Data Access (SDA) tool.

* * * * *